(12) United States Patent
Mahaffy

(10) Patent No.: US 7,510,227 B2
(45) Date of Patent: Mar. 31, 2009

(54) VEHICLE REAR SEAT

(75) Inventor: Jennifer Mahaffy, Tipton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/693,780

(22) Filed: Mar. 30, 2007

(65) Prior Publication Data
US 2008/0238125 A1 Oct. 2, 2008

(51) Int. Cl.
B60N 2/005 (2006.01)

(52) U.S. Cl. .................... 296/64; 296/65.09; 296/65.11

(58) Field of Classification Search ............... 296/65.9, 296/65.11, 65.16, 64, 65.09
See application file for complete search history.

(56) References Cited

U.S. PATENT DOCUMENTS

| 262,570 | A |   | 8/1882 | Chegwin |
| 1,471,001 | A |   | 10/1923 | Nicholson |
| 2,587,679 | A |   | 3/1952 | Atkinson |
| 2,839,312 | A | * | 6/1958 | Barenyi et al. ............... 280/775 |
| 6,145,913 | A |   | 11/2000 | Odagaki et al. |
| 6,270,140 | B1 |   | 8/2001 | Opfer et al. |
| 6,286,886 | B1 |   | 9/2001 | Odagaki et al. |
| 6,457,765 | B1 |   | 10/2002 | Bergquist et al. |
| 6,598,926 | B1 | * | 7/2003 | Price et al. ............... 296/65.09 |
| 6,609,745 | B2 |   | 8/2003 | Miyahara et al. |
| 6,648,393 | B1 |   | 11/2003 | Milnar et al. |
| RE38,845 | E |   | 10/2005 | Odagaki et al. |
| RE39,101 | E |   | 5/2006 | Miyahara et al. |
| 7,121,609 | B2 |   | 10/2006 | Tame |
| 7,252,319 | B2 | * | 8/2007 | Toyota et al. ............ 296/65.09 |
| 2002/0011737 | A1 |   | 1/2002 | Miyahara et al. |
| 2002/0153740 | A1 | * | 10/2002 | Miyahara et al. ............... 296/64 |
| 2005/0230996 | A1 |   | 10/2005 | Toyota et al. |
| 2006/0108822 | A1 |   | 5/2006 | Tame |
| 2006/0220411 | A1 |   | 10/2006 | Pathak et al. |

FOREIGN PATENT DOCUMENTS

EP 0331241 9/1989

* cited by examiner

Primary Examiner—Dennis H Pedder
(74) Attorney, Agent, or Firm—Gifford, Krass, Sprinkle, Anderson & Citkowski, P.C.

(57) ABSTRACT

An automotive vehicle includes a floor, an outboard seat and an inboard seat. The floor extends transversely between opposite sides of the vehicle. The outboard seat and inboard seat are arranged in a transversely extending row along the floor of the vehicle, wherein the inboard seat is disposed at an inboard position and the outboard seat is disposed at an outboard position. The inboard seat is slidably coupled to the floor for transverse sliding movement between the inboard and outboard positions. The outboard seat is tiltable to accommodate displacement of the inboard seat between the inboard and outboard positions.

12 Claims, 3 Drawing Sheets

VEHICLE REAR SEAT

FIELD OF THE INVENTION

The invention relates to a rear seat for an automotive vehicle. More particularly, the invention relates to a rear seat having an outboard portion that is stowable to accommodate movement of a middle portion between an inboard position and an outboard position within the vehicle.

BACKGROUND OF THE INVENTION

When installing a child seat in a vehicle, it is often desirable to place the child seat in an inboard position of a rear seat. This, however, makes it inconvenient to place and secure a child in the child seat from outside of the vehicle, since one must bend and reach to access the child seat. It remains desirable to provide a seating arrangement that allows one to install a child seat in the middle position and at the same time eliminates the need to bend and reach to access the child seat from outside of the vehicle.

SUMMARY OF THE INVENTION

According to one aspect of the invention, an automotive vehicle includes a floor, an outboard seat, and an inboard seat. The floor extends transversely between opposite sides of the vehicle. The outboard seat and inboard seat are arranged in a transversely extending row along the floor of the vehicle, wherein the inboard seat is disposed at an inboard position and the outboard seat is disposed at an outboard position. The inboard seat is slidably coupled to the floor for transverse sliding movement between the inboard and outboard positions. The outboard seat is tiltable to accommodate displacement of the inboard seat between the inboard and outboard positions.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE PREFERRED EMBODIMENTS

Figure 1:
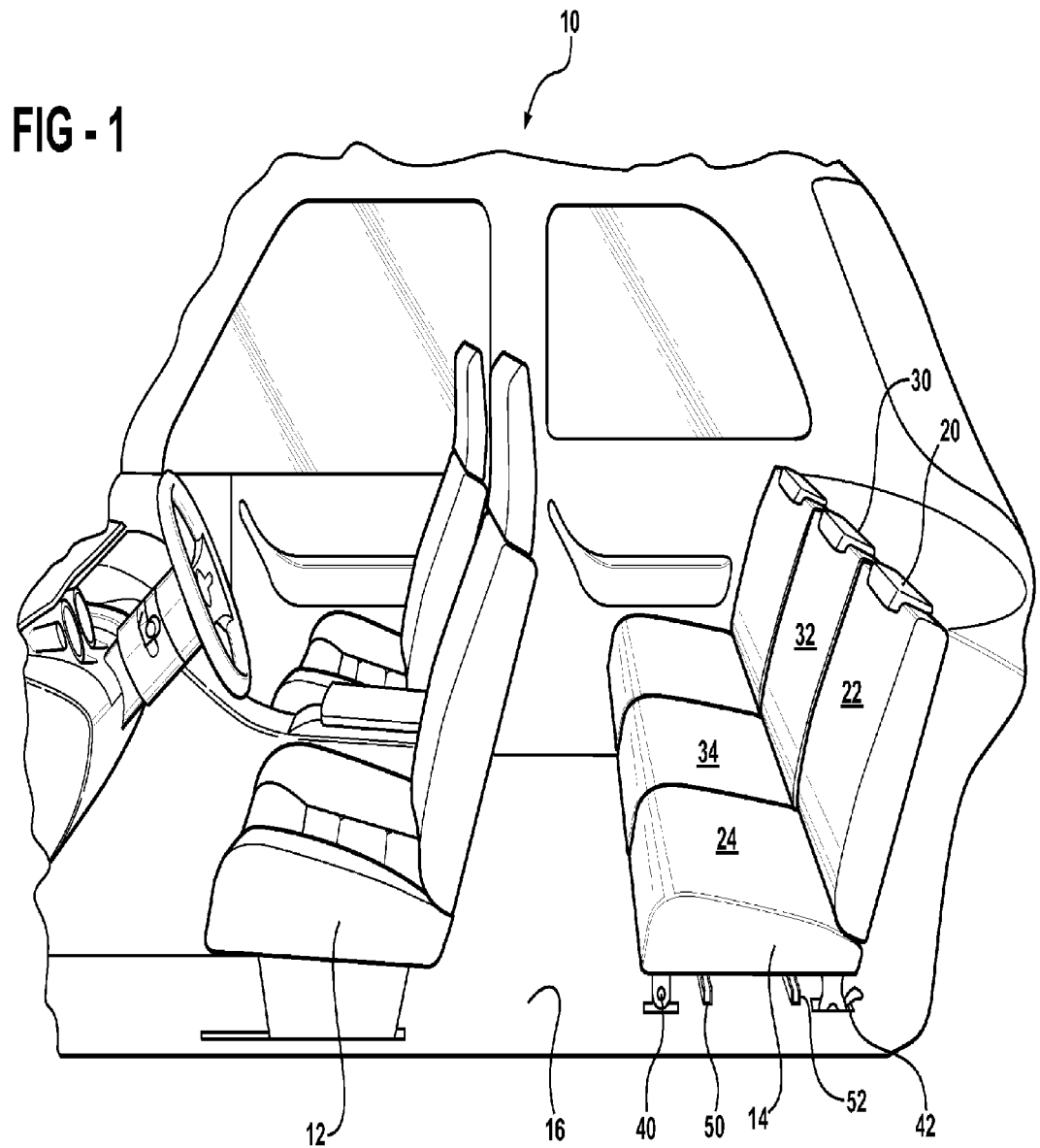
FIG. 1 is a perspective view of a vehicle, which has been partially cutaway to show front and back rows of seats.

Referring to the figures, a passenger compartment of a vehicle 10 is shown with front 12 and rear 14 rows of seating. The rear row 14 of seating includes an outboard seat 20 and an inboard seat 30. In some instances, the front row of seating 12 can have two seats and the inboard seat 30 can be a center seat between two outer seats as shown in FIG. 1. As such, the rear row 14 can have three seats. Each seat 20, 30 includes a generally horizontal seat cushion 24, 34 and a generally upright seat back 22, 32 for supporting the back of an occupant seated on the seat cushion 24, 34.

Figure 3:
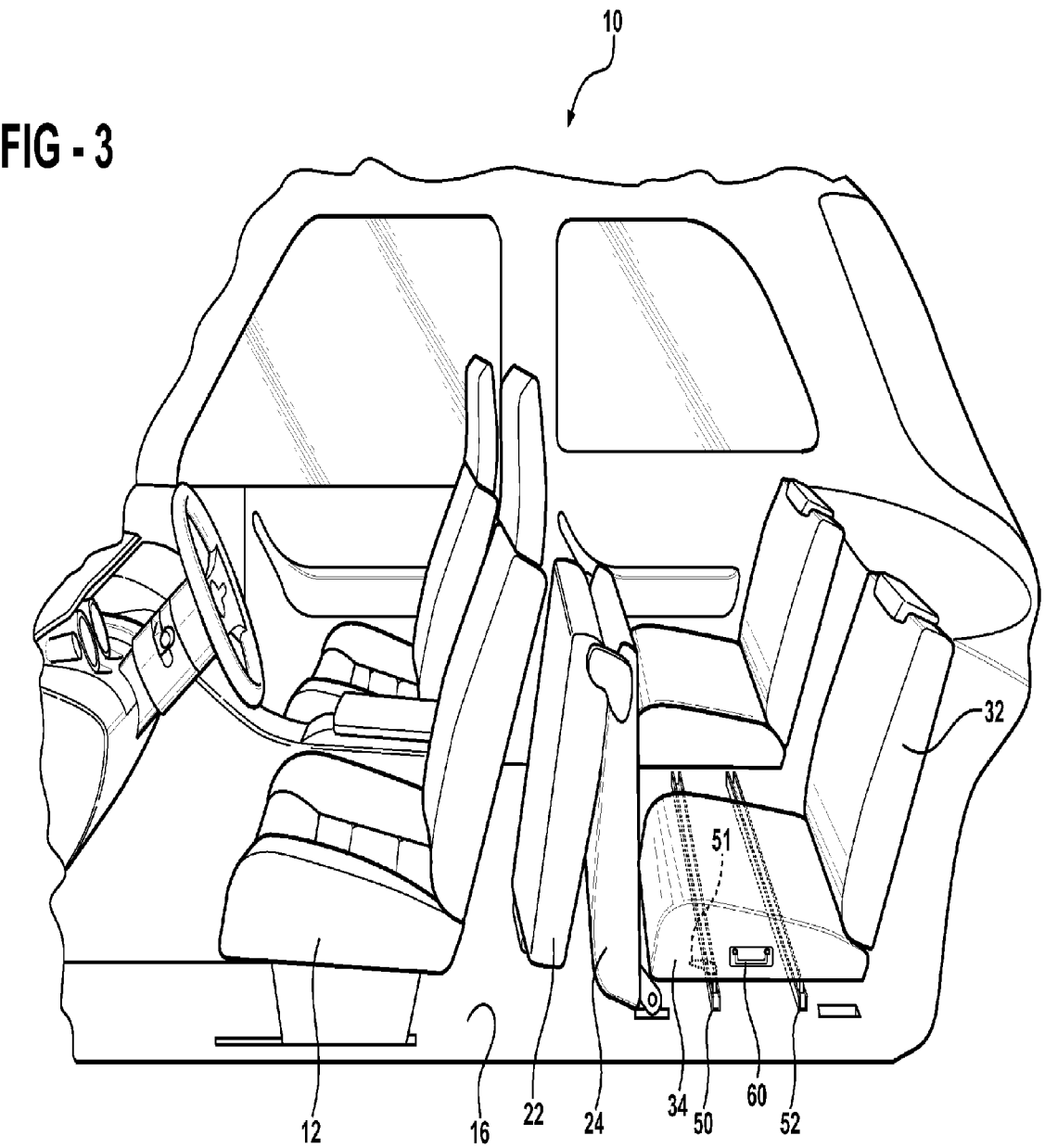
FIG. 3 is a perspective view of the vehicle with the outboard seat tilted and an interior seat moved to an outboard position formerly occupied by the tilted outboard seat.

The inboard seat 30 is slidably coupled to a floor 16 in the vehicle 10. More specifically, the seat cushion 34 of the inboard seat 30 is slidably coupled to the floor 16 by a set of tracks 50, 52 that extend in a transverse direction along the floor 16. By this arrangement, the seat cushion 34 of the inboard seat 30 is movable between an inboard position, as shown in FIG. 1, and an outboard position, as shown in FIG. 3. In the illustrated embodiment, the seat back 32 of the inboard seat 30 is pivotally coupled to the seat cushion 34. Optionally, the seat cushion of the inboard seat may be movable between the middle and outboard position independently of the seat back. In such an arrangement, the seat back of the inboard seat would be directly pivotally coupled to or otherwise fixedly secured to the vehicle. Optionally, the seat back is pivotally coupled to the seat cushion for movement between a generally upright seating position, a forwardly folded position overlying the seat cushion and/or any one of a plurality of reclined positions therebetween. Optionally, the tracks may include a latch mechanism 51 for locking the inboard seat 30 in the middle position, the outboard position, or any one of a plurality of positions therebetween.

Figure 2:
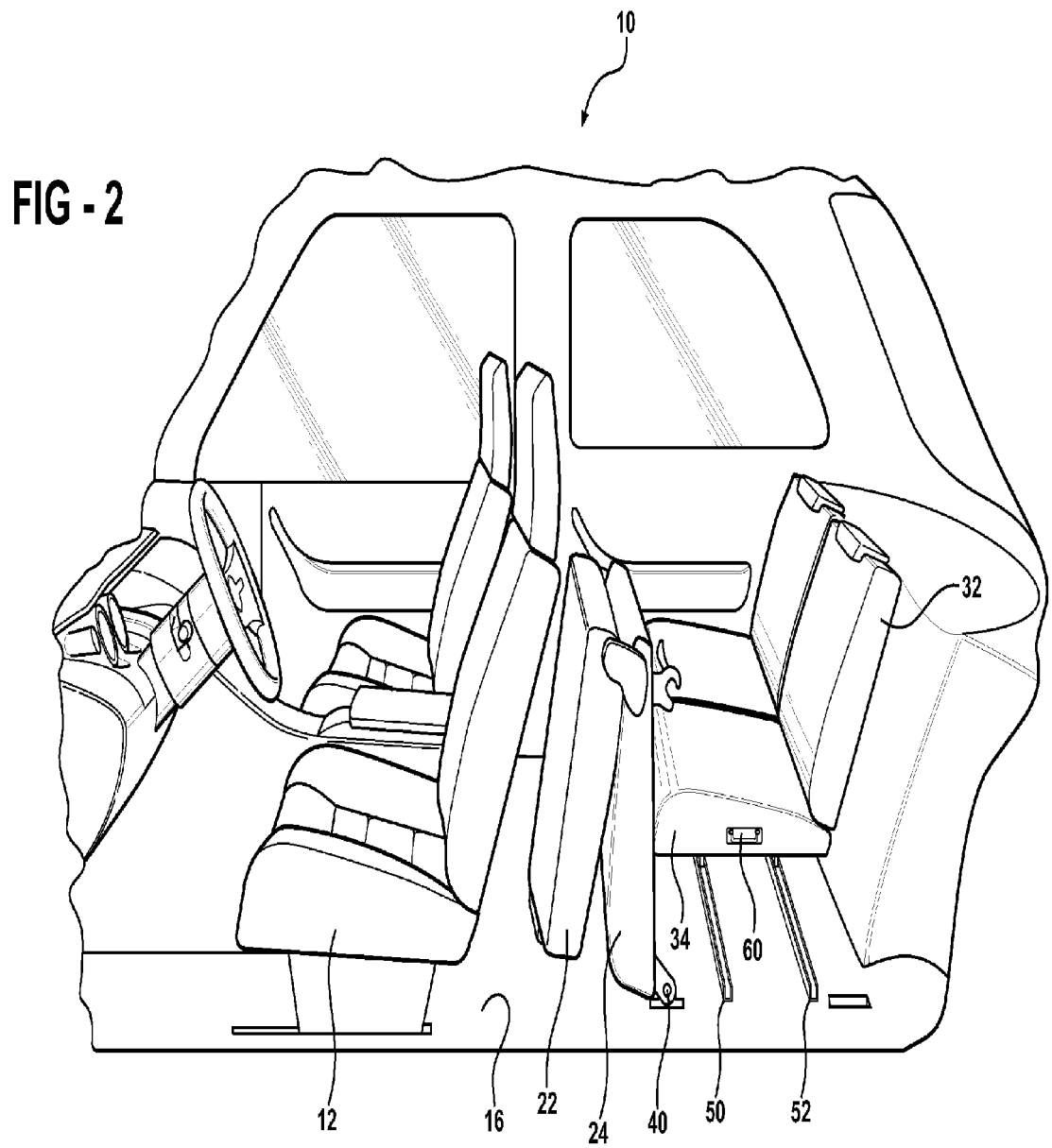
FIG. 2 is a perspective view of the vehicle with an outboard seat tilted.

The seat cushion 24 of the outboard seat 20 is pivotally coupled to the floor 16 of the vehicle 10 for movement about a fixed, single pivot 40 between a seating position, as shown in FIG. 1, and a stowed position, as shown in FIGS. 2 and 3. As shown in the figures, the inboard seat 30 can be directly behind the outboard seat 20 when the outboard seat 20 is in the stowed position and the inboard seat 30 is in the outboard position. In the stowed position, the outboard seat 20 is tipped forwardly about the single pivot 40 to allow the inboard seat 30 to move between the middle and outboard positions without interference with the outboard seat 20. In the illustrated embodiment, the seat back 22 of the outboard seat 20 is pivotally coupled relative to the seat cushion 24 for movement of the seat back 22 relative to the seat cushion 24 between an upright seating position, as shown in FIG. 1, and a folded flat position overlying the seat cushion 34, as shown in FIGS. 2 and 3. Optionally, the seat cushion of the outboard seat may be movable between the seating and stowed position independently of the seat back, wherein the seat back is directly pivotally coupled to or otherwise fixedly secured to the vehicle. Optionally, the seat cushion is movably coupled to the floor by an at least four-bar linkage instead of a single pivot for movement between the seating and stowed positions. Optionally, the seat cushion is removably attached to the floor of the vehicle for removal of the outboard seat to accommodate transverse displacement of the inboard seat between the outboard and inboard positions.

In use, the outboard seat 20 is locked in the seating position by a floor latch 42 that lockingly engages a recessed receiver (not shown) in the floor 16. To improve access to the inboard seat 30 by a user standing outside of the vehicle, the inboard seat 30 may be moved from the inboard position, as shown in FIG. 2, to the outboard position, as shown in FIG. 3. Prior to moving the inboard seat 30 to the outboard position, however, the outboard seat 20 must be moved from the seating position, as shown in FIG. 1, to the stowed position, as shown in FIGS. 2 and 3. The seat back 22 of the outboard seat 20 must be moved to the folded flat position overlying the seat cushion 24. The floor latch 42 is then unlocked to allow movement of the outboard seat 20 to the stowed position. With the outboard seat 20 in the stowed position, the inboard seat 30 may then be moved to the outboard position. A grab handle 60 may be provided on the seat cushion 34 of the inboard seat 30 to facilitate movement of the inboard seat 30 to the outboard position.

The invention has been described in an illustrative manner. It is, therefore, to be understood that the terminology used is intended to be in the nature of words of description rather than of limitation. Many modifications and variations of the invention are possible in light of the above teachings. For example, the inboard and outboard seats of the illustrated embodiment are shown in a passenger car having two rows of seating. The seating arrangement as described herein is also applicable to vehicles having one row of seating, such as a pickup, or more than two rows of seating, such as a van. The seating arrangement as described herein is further applicable to transport vehicles having rows of seating arranged in a fore and aft direction in the vehicle, instead of the transverse orientation of the illustrated embodiment. Thus, within the scope of the appended claims, the invention may be practiced other than as specifically described.

I claim:

1. An automotive vehicle comprising:
a front row having two seats and a rear row having three seats;
a floor extending transversely between opposite sides of the vehicle;
the three seats of the rear row having an outboard seat and an inboard seat arranged in a transversely extending row along the floor of the vehicle, wherein the inboard seat is a center seat disposed at an inboard position and the outboard seat is disposed at an outboard position,
the inboard seat being slidably coupled to the floor by a set of tracks for transverse sliding movement between the inboard and outboard positions;
the outboard seat being tiltable forwardly about a single pivot to a stowed position to accommodate displacement of the inboard seat between the inboard and outboard positions;
the inboard seat being substantially aligned behind the outboard seat when the outboard seat is in the stowed position and the inboard seat is in the outboard position, whereby a user standing outside the motor vehicle has improved access to the inboard seat when in the outboard position.

2. An automotive vehicle as set forth in claim 1, wherein the outboard seat is pivotally coupled to the floor of the vehicle for movement between the seating position and the stowed position.

3. An automotive vehicle as set forth in claim 1 including a latch mechanism for releasably locking the outboard seat in the seating position.

4. An automotive vehicle as set forth in claim 1, wherein the outboard seat includes a seat cushion and a seat back for supporting an occupant seated on the seat cushion, the seat back being pivotally coupled to the seat cushion for movement between a generally upright seating position and a folded position overlying the seat cushion to facilitate movement of the outboard seat between the seating position and the stowed position.

5. An automotive vehicle as set forth in claim 1, wherein the outboard seat includes a seat cushion and a seat back for supporting an occupant seated on the seat cushion, the seat cushion being pivotally coupled to the floor of the vehicle for movement about a fixed pivot between the seating position and the stowed position independently of the seat back.

6. An automotive vehicle as set forth in claim 1, wherein the inboard seat includes a seat cushion and a seat back for supporting an occupant seated on the seat cushion, the seat cushion of the inboard seat being slidably coupled to the floor of the vehicle for transverse movement between the inboard position and the outboard position.

7. An automotive vehicle as set forth in claim 6, wherein the seat back is coupled to the seat cushion for movement therewith between the inboard position and the outboard position.

8. An automotive vehicle as set forth in claim 7, wherein the seat back is pivotally coupled to the seat cushion for movement between a seating position and a stowed position.

9. An automotive vehicle as set forth in claim 6, wherein the seat cushion includes a grab handle that facilitates selective movement of the inboard seat between the inboard position and the outboard position.

10. An automotive vehicle as set forth in claim 1, wherein the inboard seat is slidably coupled to the floor of the vehicle by a pair of transversely extending tracks.

11. An automotive vehicle as set forth in claim 10, wherein the tracks include a latch mechanism for releasably locking the inboard seat in the inboard position, the outboard position, or any one of a plurality of positions therebetween.

12. An automotive vehicle as set forth in claim 10, wherein the tracks extend beneath the outboard seat when the outboard seat is in the seating position.

* * * * *